United States Patent
Ahn et al.

(10) Patent No.: US 8,968,918 B2
(45) Date of Patent: Mar. 3, 2015

(54) BATTERY PACK

(71) Applicant: Samsung SDI Co., Ltd., Yongin-si, Gyeonggi-do (KR)

(72) Inventors: Byungkook Ahn, Yongin-si (KR); Daeyon Moon, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 237 days.

(21) Appl. No.: 13/739,952

(22) Filed: Jan. 11, 2013

(65) Prior Publication Data

US 2013/0244084 A1    Sep. 19, 2013

(30) Foreign Application Priority Data

Mar. 15, 2012    (KR) .................. 10-2012-0026713

(51) Int. Cl.
*H01M 2/00*    (2006.01)
*H01M 2/10*    (2006.01)
*H01M 4/04*    (2006.01)
*H01M 2/04*    (2006.01)
*H01M 2/02*    (2006.01)

(52) U.S. Cl.
CPC .......... *H01M 2/1061* (2013.01); *H01M 4/0433* (2013.01); *H01M 2/0434* (2013.01); *H01M 2/0217* (2013.01)
USPC .......... 429/163; 429/138; 429/151; 429/153; 429/154; 429/155; 429/159; 429/175; 429/176

(58) Field of Classification Search
CPC ............ H01M 2/1061; H01M 2/0434; H01M 2/02171; H01M 4/0433
USPC ......... 429/138, 151, 154, 155, 159, 163, 175, 429/176
See application file for complete search history.

(56) References Cited

U.S. PATENT DOCUMENTS

2008/0305367 A1    12/2008    Baek et al.

FOREIGN PATENT DOCUMENTS

| JP | 05-294307 | 11/1993 | | |
|---|---|---|---|---|
| JP | 2005-022336 | 1/2005 | | |
| JP | 2010-210874 | 9/2010 | | |
| KR | 10-2006-0102660 | 9/2006 | | |
| KR | 10-2008-0107185 | 12/2008 | | |
| KR | 20080107185 A | * | 12/2008 | .............. H01M 2/02 |
| KR | 10-2009-0012893 | 2/2009 | | |

* cited by examiner

*Primary Examiner* — Patrick Ryan
*Assistant Examiner* — Ben Lewis
(74) *Attorney, Agent, or Firm* — Robert E. Bushnell, Esq.

(57) ABSTRACT

A battery pack includes a region spaced a certain distance apart from a hole of a battery case. The region is different in surface roughness from the other regions of the battery case, and thus, a forming error of the hole may be visually detected, so as to decrease a condition setting time for controlling the forming error.

19 Claims, 5 Drawing Sheets

BATTERY PACK

CLAIM OF PRIORITY

This application makes reference to, incorporates the same herein, and claims all benefits accruing under 35 U.S.C. §119 from an application earlier filed in the Korean Intellectual Property Office on 15 Mar. 2012 and there duly assigned Serial No. 10-2012-0026713.

BACKGROUND OF THE INVENTION

1. Field of the Invention

An embodiment of the present invention relates to a battery pack, and more particularly, to a battery pack reducing the manufacture time thereof.

2. Description of the Related Art

In general, a battery pack used in portable electronic devices such as notebooks, personal digital assistants (PDAs), and camcorders includes multiple battery cells in the form of a package to overcome the capacity limitation of a single battery cell.

The battery pack usually includes a first case; a second case coupled to the first case; multiple battery cells disposed in a space formed by the first and second cases; and a protection circuit board controlling the charging and discharging of the battery cells. Such battery packs may be installed on electronic devices such as notebooks, PDAs, and camcorders and supply electric power to these electronic devices.

Therefore, the power supply time, size, and weight of battery packs are the main factors during the determination of the portability and mobility of portable electronic devices. In addition, as electronic devices are slimmed and miniaturized, the thickness of battery packs is decreased as well as the power supply time, size, and weight thereof.

To this end, when a hard battery case is formed through injection molding, a hole may be formed in the battery case, and a label for covering the hole may be attached to the battery case. As the thickness of a battery case formed through injection molding is decreased, however, a defect rate of holes may be increased. To prevent the increased defect rate of the holes, when a battery case is formed through injection molding, a condition setting time for controlling a forming error of a hole may be increased. The condition setting time refers the time period for setting the optimized condition for manufacturing the battery case. The forming error refers to a condition in which a defective hole is formed. In addition, there is no clear criterion for determining whether a hole of a battery case formed through injection molding is defective.

SUMMARY OF THE INVENTION

An aspect of the present invention provides a battery pack including a region at the periphery of a hole. The region is different in surface roughness from the other regions, and thus, a forming error of the hole may be visually detected, so as to decrease a condition setting time for controlling a forming error.

In accordance with one embodiment of the present invention, a battery pack includes at least one battery cell; and a battery case accommodating the battery cell. The battery case includes a first case that has a box shape with an opening, and includes at least one first hole penetrating a first placement plate opposed to the opening, and a first region spaced apart from a periphery of the first hole; and a second case that has a box shape with an opening, and is coupled to the first case. The first region may be greater in surface roughness than the other regions of the first case.

The first region may be spaced apart from the periphery of the first hole by a distance ranging from about 1 mm to about 1.5 mm.

A thickness of the first placement plate at the periphery of the first hole may be about 0.4 mm or greater.

The first region may be disposed on an outer surface of the first placement plate.

The battery pack may further include a first label that covers the outer surface of the first placement plate.

The first hole may be disposed inside the first region that has an approximately tetragonal shape, and have a tetragonal shape.

The second case may include at least one second hole penetrating a second placement plate opposed to the opening of the second case; and a second region spaced apart from a periphery of the second hole. The second region may be greater in surface roughness than the other regions of the second case.

The second region may be disposed on an outer surface of the second placement plate.

The first hole of the first case may correspond in position to the second hole of the second case.

The first hole and the second hole may geometrically correspond in position to the battery cell disposed between the first placement plate and the second placement plate.

The second region may be disposed on an outer surface of the second placement plate.

The battery pack may further include a second label that covers the outer surface of the second placement plate.

The second hole may be disposed inside the second region that has an approximately tetragonal shape, and have a tetragonal shape.

The battery cell may be a prismatic or pouch type battery.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1A:
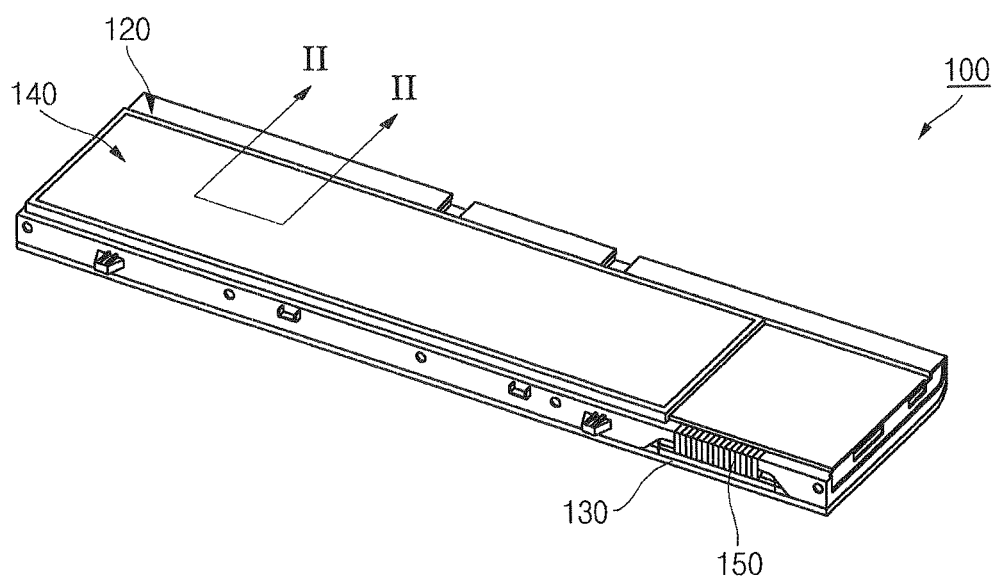
FIG. 1A is an oblique perspective view illustrating a battery pack constructed with one embodiment of the present invention.

Korean Patent Application No. 10-2012-0026713 filed on Mar. 15, 2012, in the Korean Intellectual Property Office, and entitled: "Battery pack" is incorporated by reference herein in its entirety.

Example embodiments will now be described more fully hereinafter with reference to the accompanying drawings;

however, they may be embodied in different forms and should not be construed as limited to the embodiments set forth herein. Rather, these embodiments are provided so that this disclosure will be thorough and complete, and will fully convey the scope of the invention to those skilled in the art.

Hereinafter, embodiments will be described in detail with reference to the accompanying drawings.

Like reference numerals denote like elements throughout.

Figure 1B:
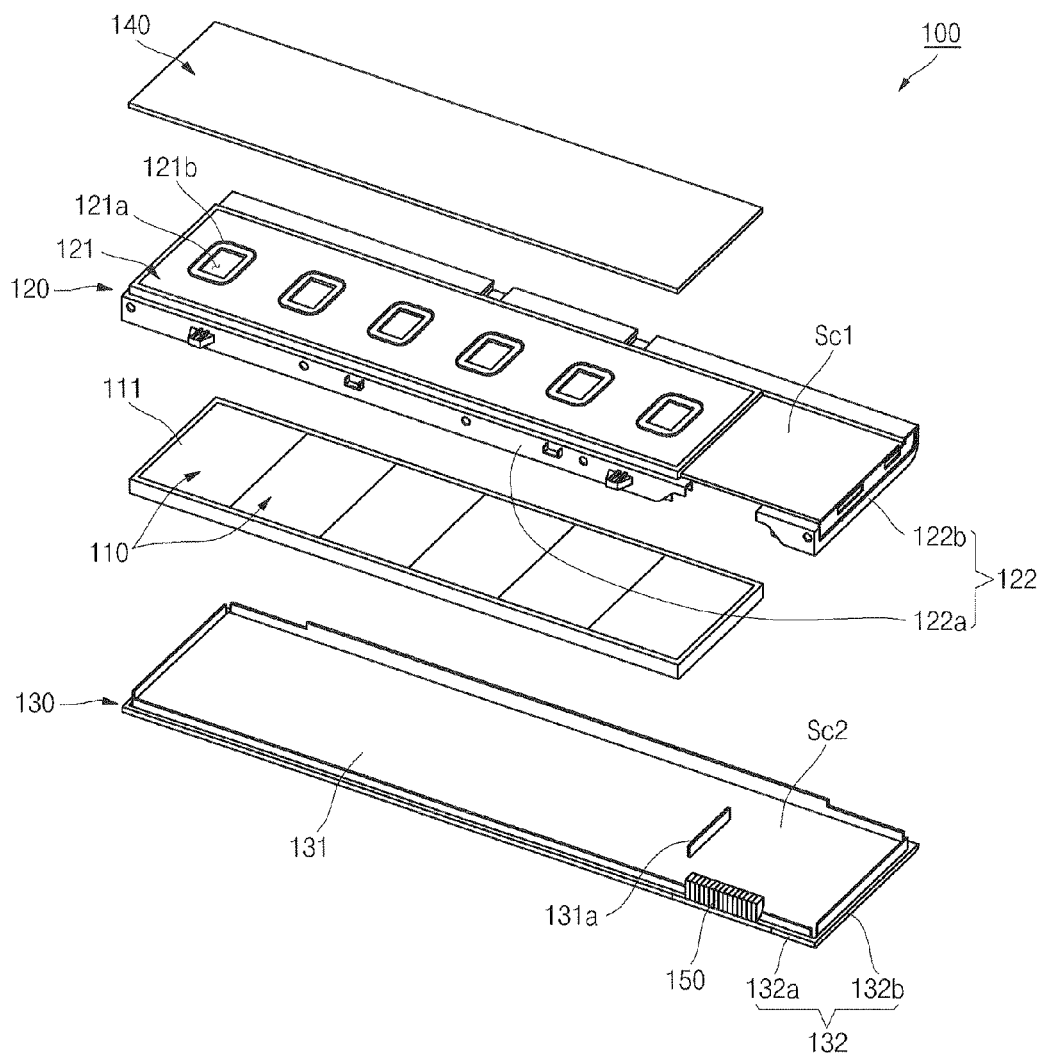
FIG. 1B is an exploded oblique view illustrating the battery pack of FIG. 1A.
Figure 2:
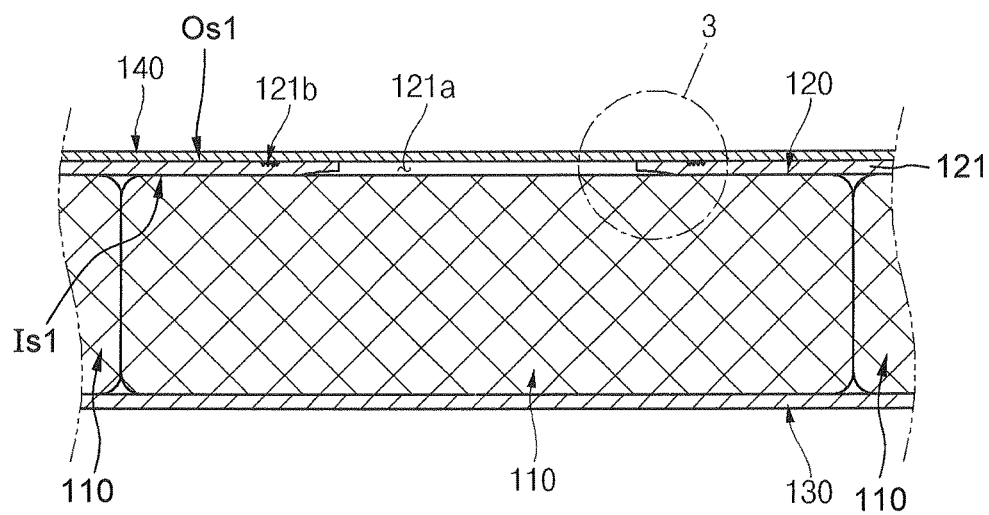
FIG. 2 is a cross-sectional view taken along line II-II of FIG. 1A.
Figure 3:
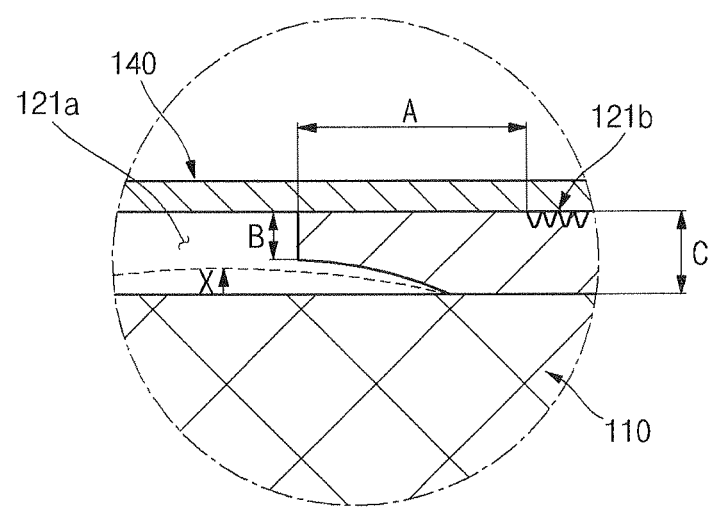
FIG. 3 is an enlarged view illustrating a portion 3 of FIG. 2.

FIG. 1A is an oblique view illustrating a battery pack constructed with an embodiment of the present invention. FIG. 1B is an exploded oblique view illustrating the battery pack of FIG. 1A. FIG. 2 is a cross-sectional view taken along line II-II of FIG. 1A. FIG. 3 is an enlarged view illustrating a portion 3 of FIG. 2.

In general, unlike primary batteries, secondary batteries are rechargeable. Such a secondary battery may be fabricated in the form of a battery pack 100, and is widely used as a power source installed on an electronic device such as a notebook computer. The battery pack 100 shown in the drawings is an example for illustration purpose, and the present disclosure is not limited thereto.

In reference to FIGS. 1A and 1B, the battery pack 100 includes one or more battery cells 110; multiple battery cases including a first case 120 and a second case 130; and a first label 140.

Hereinafter, the battery pack 100 illustrated in FIGS. 1A and 1B will now be described with reference to FIGS. 2 and 3.

At least one battery cell 110 performs a discharging operation for supplying power to an external load, and a charging operation for receiving power from a charger. The battery cell 110 may include an electrode assembly (not shown) including a negative electrode, a positive electrode, and a separator disposed therebetween; an exterior member 111 receiving the electrode assembly and electrolyte; and an electrode tab (not shown) electrically connected to the electrode assembly and exposed through the exterior member 111. The electrode tab of the battery cell 110 may be connected in series or in parallel to the electrode tab of another adjacent battery cell 110. As such, at least one battery cell 110 may be electrically connected to another adjacent battery cell 110, and the capacity of the battery pack 100 may be determined. The exterior member 111 may be a pouch or a prismatic case. The number of the battery cells 110 illustrated in FIG. 1B is six, however, the number and connection type of the battery cells 110 may be varied with the capacity and size of the battery pack 100.

The battery cases include the first case 120 and the second case 130 and form an open box to receive the battery cell 110.

The first case 120 has a box shape with an open bottom to receive the battery cell 110, and includes a circuit module installation space Sc1 at a side thereof to receive a circuit module (not shown) and a connector 150.

The first case 120 includes a first placement plate 121 disposed oppositely to the open bottom; and a first side part 122 bent downward from an edge of the first placement plate 121.

The first placement plate 121 has a rectangular plate shape with two face-to-face longer sides and two face-to-face shorter sides. The two face-to-face longer sides are disposed spaced apart from each other and opposite to each other. The two face-to-face shorter sides are disposed spaced apart from each other and opposite to each other. The two face-to-face longer sides are connected to each other with the two face-to-face shorter sides. The first placement plate 121 includes one or more first holes 121a and a first region 121b which is spaced apart from the periphery of the first hole 121a. In one embodiment, the first region 121b may surround the entirety of the first hole 121a. In one embodiment, each first region 121b corresponds to each first hole 121a.

The first hole 121a penetrates the first placement plate 121. Each first hole 121a is disposed to geometrically correspond to each battery cell 110 accommodated in the first case 120. That is, when the number of the battery cells 110 is six as illustrated in FIG. 1B, six first holes 121a are disposed in positions of the first placement plate 121 corresponding to the battery cells 110, respectively.

The first holes 121a are formed when the first case 120 is manufactured by injection molding. The first placement plate 121 has a thickness B of about 0.4 mm or greater at the periphery of the first hole 121a, which is a minimum thickness for injection molding. The thickness B may be smaller than a thickness C of the first placement plate 121. The first hole 121a has a tetragonal shape with round corners, but the shape of the first hole 121a is not limited thereto, for example, the first hole 121a may have a circular or polygonal shape.

While the first case 120 is formed through injection molding, the first region 121b may be formed using a mold corroded with a chemical. The first case 120 and the first region 121b are simultaneously formed through the injection molding. Since a region of the mold corresponding to the first region 121b is corroded with the chemical, the first region 121b is greater in surface roughness than the other regions of the first case 120. The first region 121b indicates the position of the first hole 121a on the first case 120. The first region 121b has a tetragonal shape with round corners, and the first hole 121a is disposed inside the first region 121b. The first region 121b may have a circular or polygonal shape, e.g., a shape corresponding to the first hole 121a. The hole 121a may be made simultaneously with the battery case 120 and the region 121b.

The first region 121b may be spaced apart from the periphery of the first hole 121a by a distance A ranging from about 1 mm to about 1.5 mm. If the first region 121b is spaced apart from the first hole 121a by a distance smaller than about 1 mm, a reference range for determining a forming error is decreased, so that a faultless hole may be mistakenly considered as a defective hole, thereby decreasing the productivity. If the first region 121b is spaced apart from the first hole 121a by a distance greater than about 1.5 mm, a defective hole may be considered as a faultless hole, thereby jeopardizing the safety and quality of the battery pack.

The distance A between the first region 121b and the first hole 121a is a tolerance for a forming error of the first hole 121a. The forming error includes a condition where, after the first case 120 is formed through injection molding, the first hole 121a is formed to protrude out of the first region 121b. The forming error includes another condition where after the first region 121b is formed, the first hole 121a is formed out of the first region 121b. That is, when the first case 120 is formed through injection molding, the first region 121b is used to determine a forming error of the first hole 121a. Since the first region 121b is different in surface roughness from the other regions of the first case 120, a forming error of the first hole 121a may be visually detected, so as to decrease a condition setting time for controlling a forming error.

The first region 121b may be formed on an outer surface Os1 of the first placement plate 121. In this case, the outer surface Os1 of the first placement plate 121 is opposite to the inner surface Is1 on which the battery cell 110 is placed, and the outer surface Os1 of the first placement plate 121 is an outer surface of the first case 120 having a box shape.

The first side part 122 of the first case 120 includes multiple longer side parts 122a bent from the face-to-face longer sides of the first placement plate 121; and multiple shorter side parts 122b bent from the face-to-face shorter sides of the first placement plate 121. The shorter side parts 122b connect the longer side parts 122a to each other. The first side part 122 may have a planar or curved surface, but is not limited thereto.

As shown in FIG. 3, when the battery cell 110 swells in an X direction as illustrated in FIG. 3, the first hole 121a receives a swelling portion of the battery cell 110, thereby decreasing the possibility of explosion due to swelling.

The second case 130 has a box shape with an open top surface to receive the battery cell 110, and includes a circuit module installation space Sc2 at a side thereof to receive the circuit module (not shown) and the connector 150. In addition, the circuit module installation space Sc2 of the second case 130 has a size geometrically corresponding to the circuit module installation space Sc1 of the first case 120. The connector 150 is electrically connected to the circuit module, and is exposed to the exterior of the first and second cases 120 and 130, so that the connector 150 may be electrically connected to or removed from an external electronic device.

As shown in FIG. 1B, the second case 130 may include a protrusion 131a on a second placement plate 131 to separate the circuit module installation space Sc2 from a space in which the battery cells 110 are installed.

The second case 130 has a size corresponding to the open bottom of the first case 120 and is coupled thereto so as to accommodate the battery cells 110. The second case 130 may be coupled to the first case 120 through an adhesive, a welding process, or a protrusion and a recess, the coupling method of the present invention is however not limited thereto.

The second case 130 includes the second placement plate 131 opposed to the open bottom of the first case 120, and a second side part 132 bent upward from an edge of the second placement plate 131.

The second side part 132 includes multiple longer side parts 132a bent from the face-to-face longer sides of the second placement plate 131; and multiple shorter side parts 132b bent from the face-to-face shorter sides of the second placement plate 131. The shorter side parts 132b connect the longer side parts 132a to each other. The second side part 132 may have a planar or curved surface, but is not limited thereto.

The first label 140 is adhered to the outer surface Os1 of the first placement plate 121 by an adhesive. That is, the first label 140 is adhered to the first case 120 to cover all of the first holes 121a and the first regions 121b on the first placement plate 121.

As such, holes may be formed in the first or second case 120 or 130, and a label may be adhered thereto, thereby decreasing the thickness of the first or second case 120 or 130. Since a forming error of the first hole 121a may be easily detected using the first region 121b, when the first and second cases 120 and 130 are formed through injection molding, the condition setting time for controlling a forming error of the first hole 121a may be decreased.

Figure 4:
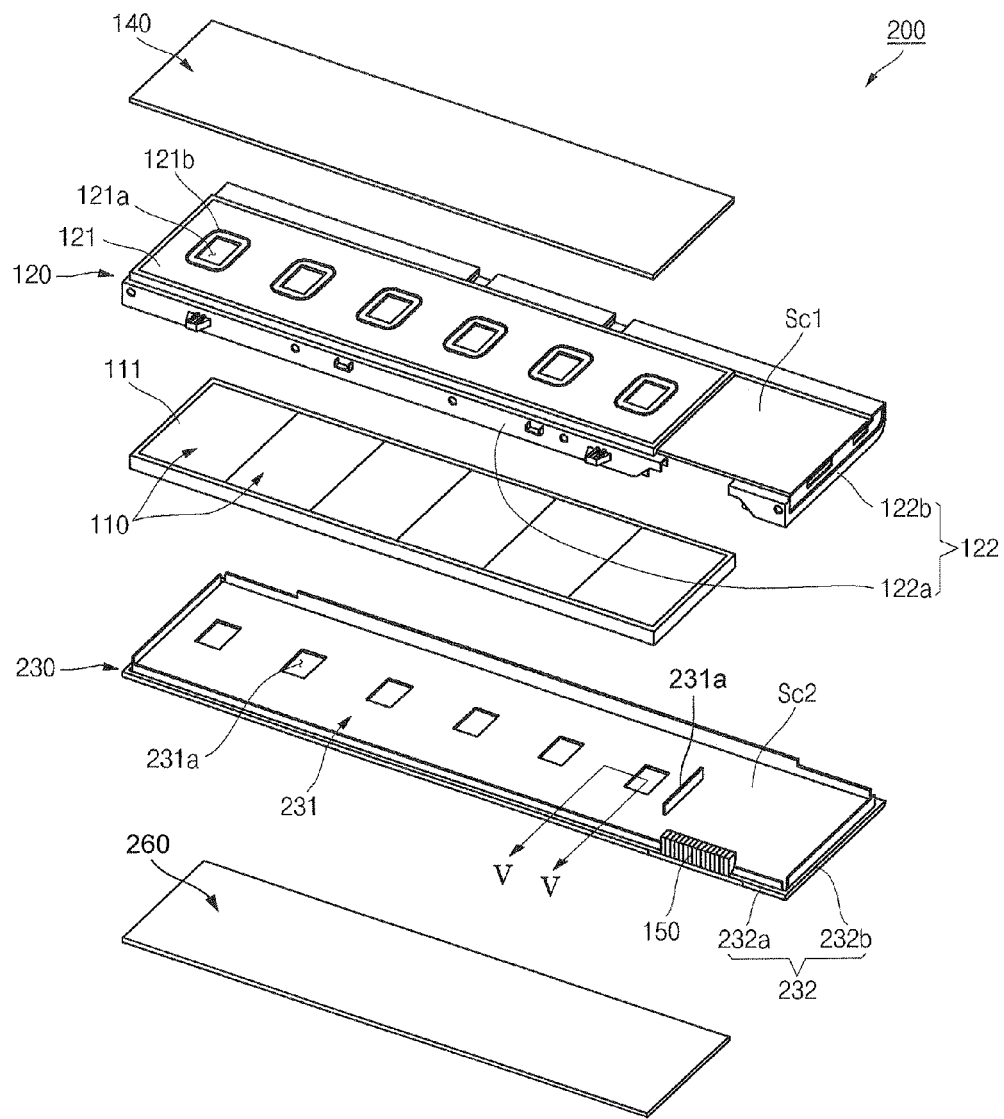
FIG. 4 is an exploded oblique view illustrating a battery pack constructed with another embodiment of the present invention.
Figure 5:
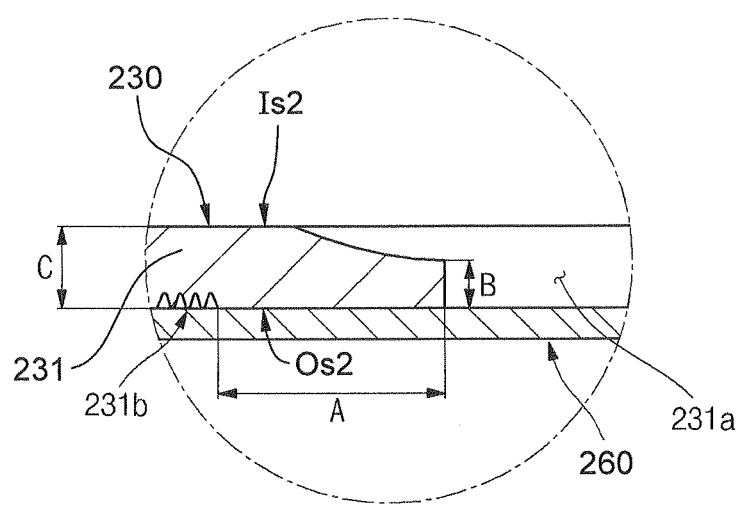
FIG. 5 is a cross-sectional view taken along line V-V of FIG. 4.

FIG. 4 is an exploded oblique view illustrating a battery pack constructed with another embodiment of the present invention. FIG. 5 is a cross-sectional view taken along line V-V of FIG. 4.

A battery pack 200 constructed with the current embodiment of the present invention includes multiple battery cells 110, a first case 120, and a first label 140, which are the same as those of the battery pack 100 illustrated in FIGS. 1A and 1B. The battery pack 200 of FIG. 4 is however different from the battery pack 100 of FIGS. 1A and 1B in that the battery pack 200 includes a second case 230 and a second label 260. Thus, the second case 230 and the second label 260 will now be described principally.

The second case 230 has a box shape with an open top to receive the battery cell 110, and includes a circuit module installation space Sc2 at a side thereof to receive a circuit module (not shown) and a connector 150. The second case 230 may include a protrusion 231a on a second placement plate 231 to separate the circuit module installation space Sc2 from a space in which the battery cells 110 are installed.

The second case 230 has a size corresponding to an open bottom of the first case 120 and is coupled thereto so as to accommodate the battery cells 110. The second case 230 may be coupled to the first case 120 through an adhesive, a welding process, or a protrusion and a recess, the coupling method of the present invention is however not limited thereto.

The second case 230 includes a second placement plate 231 opposed to the open top; and a second side part 232 bent upward from an edge of the second placement plate 231.

The second placement plate 231 has a rectangular plate shape with two face-to-face longer sides and two face-to-face shorter sides. The second placement plate 231 includes one or more second holes 231a and a second region 231b spaced apart from the periphery of the second hole 231a. In one embodiment, the second region 231b may surround the entirety of the second hole 231a.

The second hole 231a penetrates the second placement plate 231, and is disposed in a position geometrically corresponding to the battery cell 110 accommodated in the second case 230. The second hole 231a is disposed in a position opposite to a first hole 121a formed in the first case 120. That is, when the number of the battery cells 110 and the number of the first holes 121a are six as illustrated in FIG. 4, the second placement plate 231 has six second holes 231a in positions geometrically corresponding to the first holes 121a.

The second holes 231a are formed when the second case 230 is formed through injection molding. The second placement plate 231 has a thickness B of about 0.4 mm or greater at the periphery of the second hole 231a, which is a minimum thickness for injection molding. The thickness B may be smaller than a thickness C of the second placement plate 231. The second hole 231a has a tetragonal shape with round corners, but the shape of the second hole 231a is not limited thereto. The first hole 121a may have a circular or polygonal shape.

While the second case 230 is formed through injection molding, the second region 231b may be formed using a mold corroded with a chemical. The second case 230 and the second region 231b are simultaneously formed through the injection molding. Since a region of the mold corresponding to the second region 231b is corroded with the chemical, the second region 231b is greater in surface roughness than the other regions of the second case 230. The second region 231b indicates the position of the second hole 231a on the second case 230. The second region 231b has a tetragonal shape with round corners, and the second hole 231a is disposed inside the second region 231b. The second region 231b may have a circular or polygonal shape, e.g., a shape corresponding to the second hole 231a. The hole 231a may be made simultaneously with the battery case 230 and the region 231b.

The second region 231b may be spaced apart from the second hole 231a by a distance A ranging from about 1 mm to about 1.5 mm. If the second region 231b is spaced apart from the second hole 231a by a distance smaller than about 1 mm, a reference range for determining a forming error is decreased, so that a faultless hole may be considered as a defective hole, thereby decreasing the productivity. If the second region 231b is spaced apart from the second hole 231a by a distance greater than about 1.5 mm, a defective hole may be considered as a faultless hole, thereby jeopardizing the safety and quality of the battery pack.

The distance A between the second region 231b and the second hole 231a is a tolerance for a forming error of the second hole 231a. For example, the forming error includes a condition where after the second case 230 is formed through injection molding, the second hole 231a is formed to protrude out of the second region 231b. The forming error also includes a condition where the second region 231b is formed, but the second hole 231a is formed out of the second region 231b. That is, when the second case 230 is formed through injection molding, the second region 231b is used to determine a forming error of the second hole 231a. A forming error of the second hole 231a may be visually detected using the second region 231b, so as to decrease a condition setting time for controlling a forming error.

The second region 231b may be formed on an outer surface Os2 of the second placement plate 231. In this case, the outer surface Os2 of the second placement plate 231 is opposite to the inner surface Is2 on which the battery cell 110 is placed, and is an outer surface of the second case 230 having a box shape.

The second side part 232 includes multiple longer side parts 232a bent from the face-to-face longer sides of the second placement plate 231; and multiple shorter side parts 232b bent from the face-to-face shorter sides of the second placement plate 231. The shorter side parts 232b connect the longer side parts 232a to each other. The second side part 232 may have a planar or curved surface, but is not limited thereto.

Since the first and second cases 120 and 230 have the first hole 121a and the second hole 231a, when the battery cell 110 swells, the first and second holes 121a and 231a receive a swelling portion of the battery cell 110, thereby decreasing the possibility of explosion due to swelling.

The second label 260 is adhered to the outer surface of the second placement plate 231 by an adhesive. That is, the second label 260 is adhered to the second case 230 to cover all of the second holes 231a and the second regions 231b on the second placement plate 231.

As such, holes may be formed in the first and second cases 120 and 230, and labels may be adhered thereto, thereby decreasing the thickness of the first and second cases 120 and 230. By receiving the swelling portion of the battery cell, the hole 121a/231a prevents the increase of thickness of the battery pack due to the swell of the battery cells during the charge and discharge. Since the first regions 121b and the second regions 231b are different in surface roughness from the other regions of the battery cases, a forming error of the first and second holes 121a and 231a may be visually detected. Thus, when the first and second cases 120 and 230 are formed through injection molding, the condition setting time for controlling a forming error of the first and second holes 121a and 231a may be decreased.

In accordance with an embodiment of the present invention, a battery pack includes a region surrounding the periphery of a hole, and the region is different in surface roughness from the other regions, and thus a forming error of the hole may be visually detected thereby decreasing a condition setting time for controlling a forming error.

Exemplary embodiments of the present invention have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present disclosure as set forth in the following claims.

What is claimed is:

1. A battery pack, comprising:
at least one battery cell; and
a battery case accommodating the battery cell, the battery case comprising:
a first case having a box shape with a first opening, the first case comprising a first placement plate disposed opposite to the first opening, at least one first hole penetrating the first placement plate, and a first region disposed on the first placement plate and spaced apart from a periphery of the first hole, with the first region being greater in surface roughness than other regions of the first case; and
a second case having a box shape with a second opening, the second case being coupled to the first case.

2. The battery pack as claimed in claim 1, wherein the first region is spaced apart from the periphery of the first hole by a distance ranging from about 1 mm to about 1.5 mm.

3. The battery pack as claimed in claim 1, wherein a thickness of the first placement plate at the periphery of the first hole is about 0.4 mm or greater.

4. The battery pack as claimed in claim 1, wherein the first region is disposed on an outer surface of the first placement plate.

5. The battery pack as claimed in claim 4, further comprising a first label that covers the outer surface of the first placement plate.

6. The battery pack as claimed in claim 1, wherein the first hole is disposed inside the first region that has an approximately tetragonal shape, and the first hole has a tetragonal shape.

7. The battery pack as claimed in claim 1, wherein the second case comprises:
at least one second hole penetrating a second placement plate which is disposed opposed to the second opening of the second case; and
a second region spaced apart from a periphery of the second hole, and the second region being greater in surface roughness than other regions of the second case.

8. The battery pack as claimed in claim 7, wherein the second region is disposed on an outer surface of the second placement plate.

9. The battery pack as claimed in claim 7, wherein the first hole of the first case geometrically corresponds in position to the second hole of the second case.

10. The battery pack as claimed in claim 7, wherein the first hole and the second hole correspond in position to the battery cell disposed between the first placement plate and the second placement plate.

11. The battery pack as claimed in claim 7, wherein the second region is disposed on an outer surface of the second placement plate.

12. The battery pack as claimed in claim 11, further comprising a second label that covers the outer surface of the second placement plate.

13. The battery pack as claimed in claim 7, wherein the second hole is disposed inside the second region that has an approximately tetragonal shape, and the second hole has a tetragonal shape.

14. The battery pack as claimed in claim 1, wherein the battery cell is a prismatic or pouch type battery.

15. A battery pack, comprising:
at least one battery cell; and
a battery case accommodating the battery cell, the battery case comprising:
a first case comprising a first opening and a first placement plate disposed opposite to the first opening, at least one first hole penetrating the first placement plate and exposing at least one battery cell, a first region surrounding the entirety of the first hole and spaced apart from a periphery of the first hole, the first region being different in surface roughness from other regions of the first case; and a second case having a box shape with a second opening, the second case being coupled to the first case.

16. The battery pack as claimed in claim 15, wherein the first region is greater in surface roughness than other regions of the first case.

17. The battery pack as claimed in claim 15, wherein the second case comprises:

at least one second hole penetrating a second placement plate which is disposed opposed to the second opening of the second case; and a second region surrounding the entirety of the second hole and disposed spaced apart from a periphery of the second hole, and the second region being different in surface roughness from other regions of the second case.

18. The battery pack as claimed in claim 17, wherein the second region is greater in surface roughness than other regions of the second case.

19. The battery pack as claimed in claim 15, wherein the battery case accommodates multiple battery cells, the first placement plate comprises multiple first holes each exposing one of the battery cells, and the first placement plate comprises multiple first regions each surrounding one of the first holes.

\* \* \* \* \*